Dec. 22, 1942.  E. ARNOLD  2,305,659
MAGNETIC CHARGING APPARATUS
Filed March 13, 1940  3 Sheets-Sheet 2
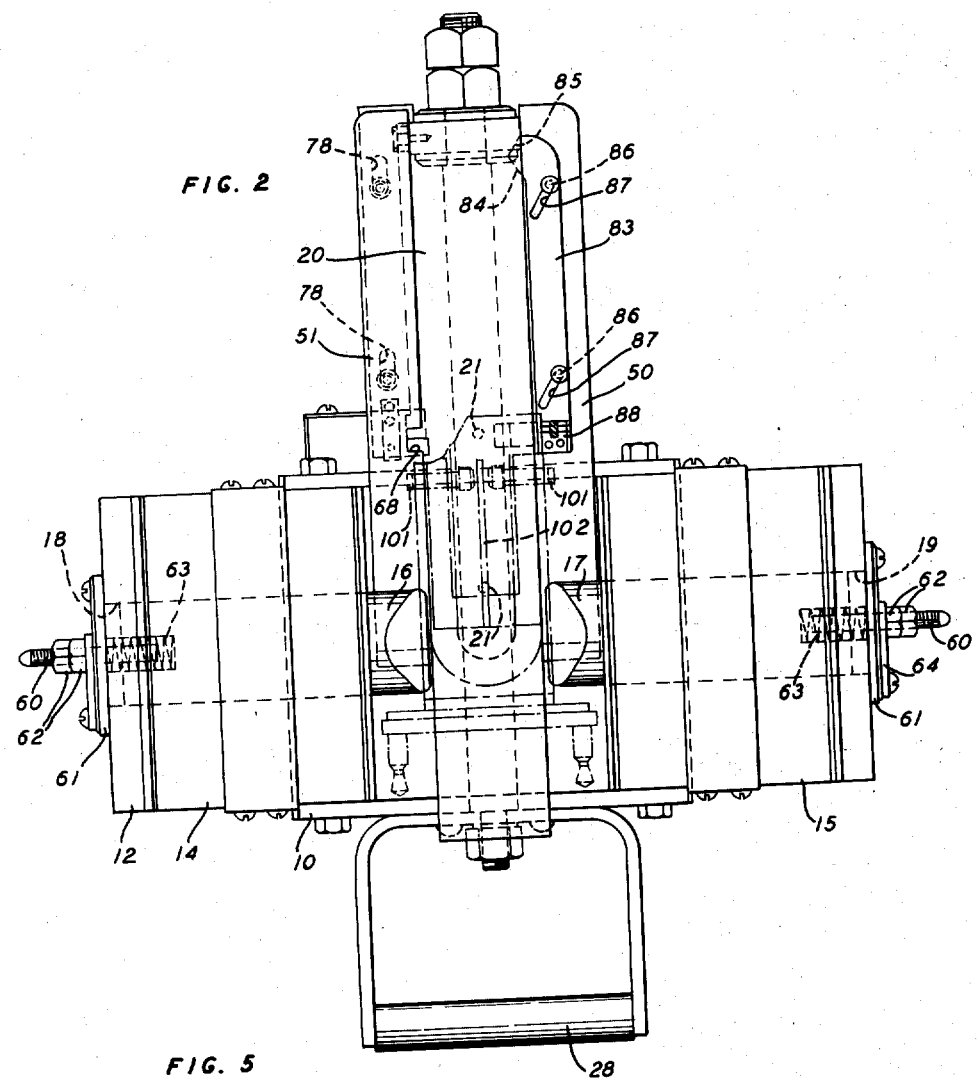
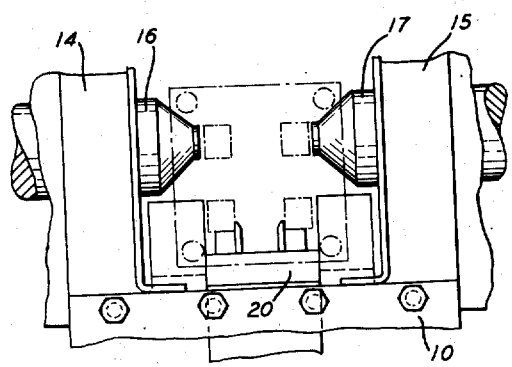
INVENTOR
E. ARNOLD
BY E. R. Nowlan
ATTORNEY Dec. 22, 1942.                    E. ARNOLD                    2,305,659
                         MAGNETIC CHARGING APPARATUS
                         Filed March 13, 1940          3 Sheets-Sheet 3
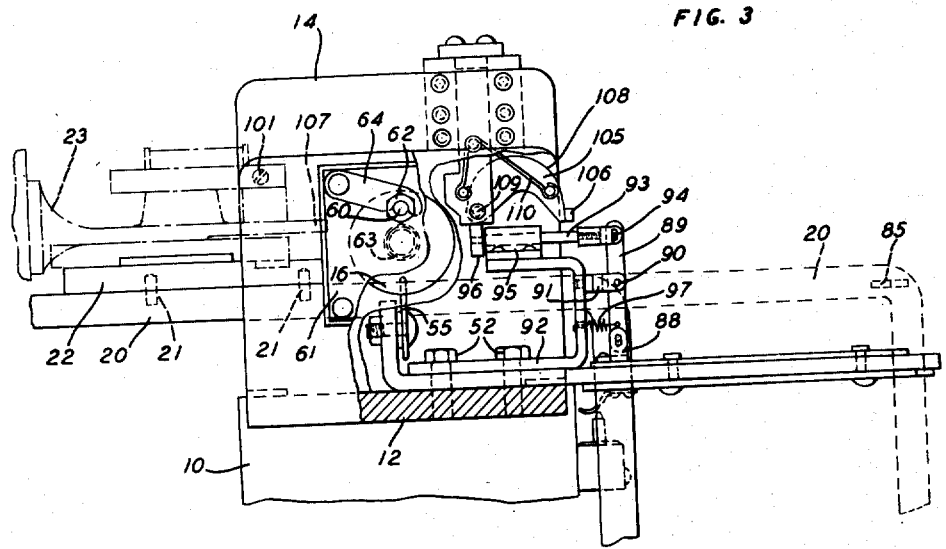
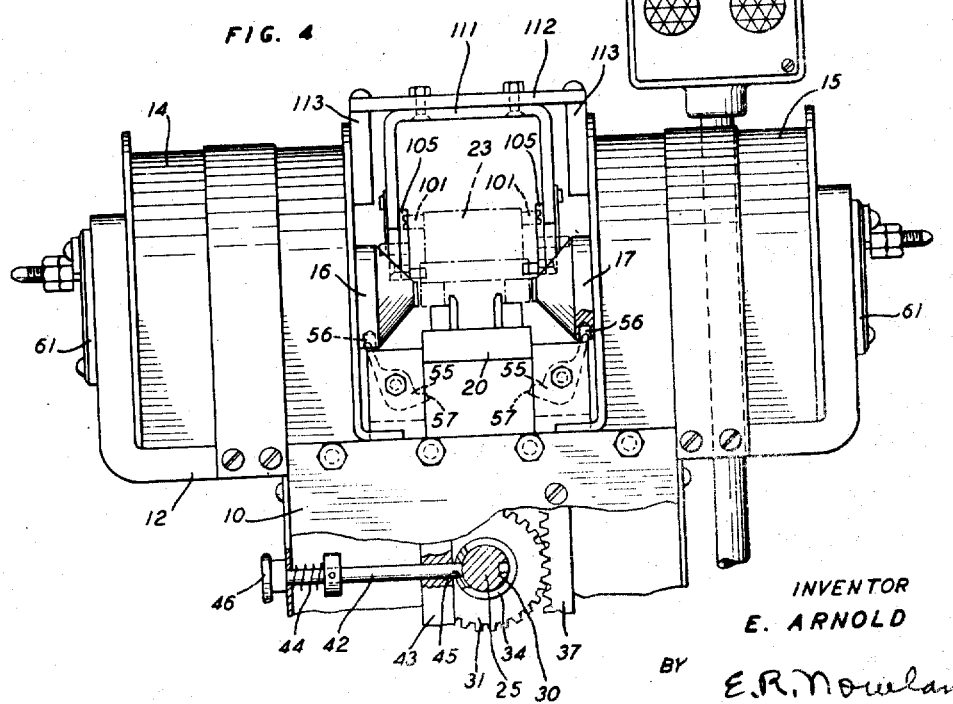
INVENTOR
E. ARNOLD
BY
E.R. Nowlan
ATTORNEY Patented Dec. 22, 1942

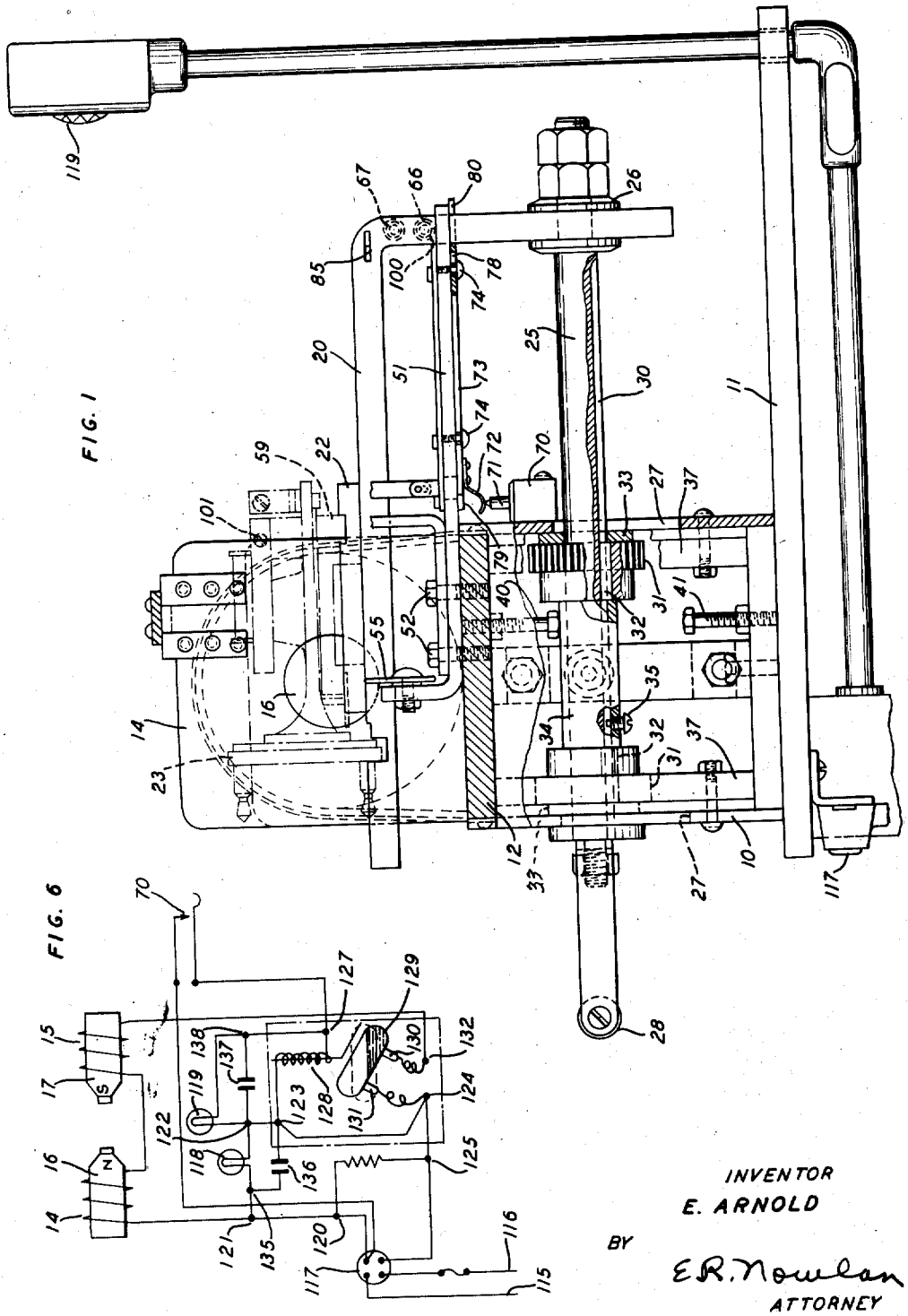

2,305,65

UNITED STATES PATENT OFFICE 2,305,659

MAGNETIC CHARGING APPARATUS

Edwin Arnold, Elizabeth, N. J., assignor to Western Electric Company, Incorporated, New York, N. Y., a corporation of New York Application March 13, 1940, Serial No. 323,741

12 Claims. (Cl. 175—21)

This invention relates to magnetic charging apparatus, and more particularly to electromagnetic apparatus for charging permanent magnets.

Permanent magnets are desirable for use in various fields with mechanical and electrical apparatus. For example, permanent magnets serve their purpose in polarized relays and in other electrical units in the field of telephony. Regardless of where or how they are used, in order to render them most efficient for the purpose intended, it is important in most instances that they be charged to saturation and that the poles thereof be properly located. To charge such magnets most efficiently it is important that they be located in the path of maximum flux in a magnetic field of sufficient strength to saturate them. To properly locate the poles at the desired portions of such magnets those portions should be positioned so that they will stop in the path of maximum flux when the charging circuit is broken or withdrawn last from the magnetic field should it be desired to locate the poles at the ends of the magnets.

An object of the invention is to provide a highly efficient and accurately dependable apparatus to magnetically charge articles.

With this and other objects in view, the invention comprises a carriage to support an article to be charged movable in one direction to lower the article relative to a magnetic field and movable in another direction to charge the article and properly locate the poles thereof, various means being associated with the carriage to control the magnetic field, to hold the carriage against movement until the magnetic field has been established and then only in a definite direction to properly charge the article, eliminate the adjustment of the carriage during the existence of the magnetic field, together with other means to eliminate the possibility of inaccurate charging of an article.

Other objects and advantages will be apparent from the following detailed description when taken in conjunction with the accompanying drawings, wherein—

Fig. 1 is a vertical sectional view of the apparatus;

Fig. 2 is a top plan view of the apparatus, certain portions thereof being broken away;

Fig. 3 is a fragmentary side elevational view of a portion of the apparatus, certain portions thereof being shown in section;

Fig. 4 is a fragmentary front elevational view of the apparatus, certain portions thereof being shown in section;

Fig. 5 is a fragmentary detailed front elevational view illustrating one type of article to be charged; and Fig. 6 is a wiring diagram illustrating the electrical control circuit for the apparatus.

Referring now to the drawings, wherein like reference numerals designate similar par throughout the views, numeral 10 designates hollow base which is mounted upon a suitab support such as a bench 11 and has a U-shape yoke 12 mounted at its upper end. As illustrate in Fig. 4, the yoke 12 is fixed near its center 1 the base and extends beyond each side there and then vertically for supporting and formin a part of electromagnetic or pole units 14 an 15. The units 14 and 15 are formed of suitab coils so that their respective cores or pole-piec 16 and 17 will be, respectively, north and sout when the coils are energized. The inner ends of the pole-pieces 16 and 17 are reduced to the gen eral contour illustrated in Figs. 2 and 4, whil the outer ends thereof extend into apertures 1 and 19 (Fig. 2) in the ends of the yoke 12. Th constitutes in general the electromagnetic mean to charge articles when properly moved relativ to the pole-pieces 16 and 17 when the coil thereof are energized.

A carriage 20 in the form of an L-shape member has pins 21 disposed in the upper surfac thereof for locating an adapter 22 thereon fo an article such as a relay 23. Various types o articles, for example, various types of relays, ma be mounted upon the carriage by the aid o adapters formed to receive such articles or relay and provided with apertures spaced to receive th pins 21. The main or upper portion of the car riage 20 extends parallel to the central portion o the yoke 12, while the rearmost portion of th carriage extends downwardly at right angles t a position where it is operatively connected to shaft 25.

The connection of the shaft 25 with the car riage, as indicated at 26, is such that the shaf may be rotated relative to the carriage but hel against longitudinal movement with respec thereto. The shaft extends forwardly of th carriage through elongate apertures 27, in th front and rear wall of the base 10, where th forward end is provided with a handle 28 t assist in the manual operation of the shaft. longitudinally extending keyway 30 in the shaf 25 provides positive connection thereof with pin ions 31 through keys 32. The pinions dispose at the spaced positions within the base 10 a illustrated in Fig. 1 are held against longitudina movement with the shaft by washers 33 dispose concentric with the shaft between their respec tive pinions and the adjacent walls of the bas and a sleeve 34 disposed concentric with th shaft between the pinions to maintain thei proper spacing. A screw 35 disposed in a thread ed aperture of the sleeve 34 has a reduced end projecting into the keyway 30 of the shaft, t hold the sleeve for rotation with the shaft and the pinions. Stationary racks 37 are rigidly mounted in the base 10 in interengagement with their respective pinions 31 and through this means, namely the racks and the pinions, the carriage, together with the shaft and the elements carried thereby, are moved upwardly or downwardly relative to the pole-pieces of the electromagnets during rotation clockwise or counterclockwise of the shaft, looking from the front or left of Fig. 1. Adjustable stops 40 and 41 are disposed in the base 10, the former being mounted in the yoke 12 and the latter being mounted in the bottom of the base to, respectively, limit the upward and downward movements of the carriage to properly locate the article relative to the pole-pieces, as will be more fully described hereinafter.

To relieve the operator of the effort of holding the carriage together with the other moving mechanism in the upward position, a spring pressed pin 42 is slidably disposed in a side wall of the base, and in an upright member 43 disposed in the base, and is normally urged inwardly by a spring 44 to cause the inner end thereof to enter an aperture 45 in the sleeve 34 to hold the sleeve against rotation and thus through the screw 35 to hold the shaft 25 against rotation to effectively hold the carriage in the upper position. A thumb nut 46 fixed to the outer end of the pin 42 enables the operator to freely move the pin outwardly against the force of the spring 44 to free the mechanism to move the carriage downwardly. If desired, suitable means may be associated with the pin 42 or the thumb nut 46 to hold the pin outwardly against engagement with the sleeve 34.

Two guide rails 50 and 51 are mounted upon the upper surface of the yoke 12 by means of screws 52 and extend rearwardly parallel with each other upon each side of the carriage 20, as illustrated in Fig. 2, to a position beyond the downwardly extending portion of the carriage when in the rearmost position, while the forward ends thereof are bent vertically to pivotally support latches 55 and serves as forward guides for the vertical and horizontal movements of the carriage. The latches 55 are of the general contour illustrated in Fig. 4, with reduced upper ends positioned to enter apertures 56 formed in the inner ends of the pole-pieces 16 and 17 while their lower ends have reduced projections 57 positioned to extend into the path of the carriage if the pole-pieces are not properly located, depending upon the type of article to be charged. In the present instance the article to be charged is a polarized relay 23 having a magnet 59 as a part thereof which is to be charged while moved through a magnetic field created by the electromagnetic units 14 and 15 when energized. The present apparatus is capable of charging various types of relays some of which vary in size, and in such instances the magnet 59 also varies in size and also in location in the relay structure. For example, in smaller types of relays, magnets are disposed near the top thereof as illustrated in Fig. 5, while in the larger types of relays the magnet is disposed nearer the bottom of the relay. Therefore, in order to assure proper positioning of the pole-pieces 16 and 17 to charge magnets of the smaller types of relays, the latches 55 are actuated by the positioning of the pole-pieces to eliminate the possibility of the movement of the carriage in the lower position while the pole-pieces are spaced apart for the larger type of magnets.

The adjustments of the pole-pieces 16 and 17 are brought about through studs 60 mounted in the pole-pieces and extending through apertures in plates 61 covering the openings in the yokes for the pole-pieces and secured to the yokes. Nuts 62, disposed on the studs, limit inward movement of the pole-pieces while they are urged inwardly by springs 63, the latter being disposed in recesses in the outer ends of the pole-pieces and abutting the plates 61. Latches 64 are movably mounted on the outer portion of the cover plates 61, as illustrated in Fig. 3, and are provided with notched outer ends to fit partially around the studs between the nuts and the plates. These latches are of suitable thickness to hold the pole-pieces outwardly away from each other while charging the large types of magnets.

Means is provided to hold the carriage against adjustment upwardly or downwardly except when disposed in extreme forward position. This means consists of rollers 66 and 67, mounted on the carriage and positioned to ride, respectively, on the upper and lower surfaces of the rail 51 when the carriage is in the upper or lower positions. These rollers will be aligned with a recess 68 in the rail 51 when the carriage is in its foremost or loading position, at which point only, the carriage may be moved upwardly or downwardly as the case may be.

A switch 70 of the normally open type having a spring actuated button or plunger 71 is positioned to be actuated by a switch cam or projection 72 when the carriage arrives at the ends of its movements forwardly and rearwardly. The cam 72 is carried by a slide 73 supported by members 74 carried by the rail 51 and extending through elongate apertures 78 in the slide. The forward end 79 of the slide 73 projects at right angles therefrom to be engaged by the downwardly projecting portion of the carriage when arriving at its foremost position, to cause forward movement of the slide to move the cam 72 from the plunger 71 to allow the switch 70 to open. In a similar manner a projection 80 of the slide 73 extending at right angles with respect to the slide is positioned to be engaged by the carriage, while the latter is arriving at the end of its rearward movement, causing similar movement of the slide 73 to move the cam 72 to actuate the plunger 71 and thus close the switch 70. The switch 70 controls the electrical circuit, which will hereinafter be described, for energizing the electromagnetic units 14 and 15 so that the article will be charged only when disposed in definite position relative to the pole-pieces.

Means is provided to hold the carriage against movement when it has been located with an article in its rearward position, at which position the switch 70 is closed to complete an electrical circuit through the electromagnet, until the electromagnet has been thoroughly energized to create the desired magnetic field. This means consists of a latch 83 disposed upon the upper surface of the rail 50 and of the general contour illustrated in Fig. 2. The rearward end of the latch 83 extends inwardly and is provided with an angular portion 84 conditioned to be received in a recess 85 of similar contour in the carriage 20 to lock the carriage against movement. The latch 83 is connected to the rail 50 through pins 86 or the like extending through angularly projecting elongate apertures 87 in the latch, to cause sideward movement of the latch away from the carriage during rearward movement thereof, the walls of the apertures 87 serving as cams against their respective pins 86. The forward end of the latch 83 has an upwardly projecting yoke 88 mounted thereon and operatively connected to the lower end of a lever 89. The lever 89 is pivotally mounted, at 90, on a bracket 91 carried by a support 92 which is mounted through the aid of the screws 52 to the rail 50. The upper end of the lever 89 is connected to a pull rod 93 through a pivotal connection 94, the pull rod being slidably disposed in a bearing 95 and having a metallic member 96 mounted on the forward end thereof and positioned to be attracted by the magnetic flux of the electromagnet. The lever 89 is normally urged in a direction to move the latch 83 forwardly into locking position by the aid of a spring 97 and thus hold the carriage against movement until a magnetic field of sufficient strength has been created through the energization of the electromagnet to attract the member 96 and actuate the pull rod 93, the lever 89 and the latch 83 to push the latch rearwardly free of the carriage. The recess 85 is positioned to receive the latch 83 when the carriage is in its lowermost position, while a recess 100 is disposed in the downwardly projecting portion of the carriage to receive the latch when the carriage is in its upper position, the recess 100 being similar in contour to the rearward half of the recess 85.

In order to efficiently charge the magnet of a relay it is important that the movable magnetic pole members 101 thereof, which are disposed upon each side of the armature 102 of the relay, be moved outwardly a sufficient distance to eliminate the possibility of forming a by-pass for the magnetic flux through these pole members and the armature and thus not thoroughly charge the magnet. It is, therefore, essential that means be provided to prevent the charging of the magnet of the relay unless the pole members 101 are moved outwardly the desired distances. These pole members are in the present instance threadedly mounted in portions of the relay and may be turned to be moved outwardly by suitable means such as a screw driver. The means to prevent charging of the magnet unless the pole members of the relay are properly spaced is shown mainly in Figs. 3 and 4 and comprises a pair of stop members 105 having inwardly extending projections 106 positioned directly in the path of a portion 107 of the relay to prevent movement of the relay on the carriage into the charging position unless the pole members 101 have been moved outwardly sufficient distances to engage cam-like surfaces 108 of the members 105 to move the members about their pivots 109 against the tension of their springs 110 to move the projections 106 downwardly out of the path of the portion 107. The pivots 109 of the stop members 105 are carried by the lower ends of a U-shaped bracket 111, this bracket also supporting the springs 110 which normally urge the stop members 105 into their upper position shown in Fig. 3. The U-shaped bracket is supported by a cross piece 112 mounted on uprights 113 carried by inner plates of the electromagnetic units 14 and 15.

Attention is now directed to the wiring diagram illustrated in Fig. 6, which includes the coils of the electromagnetic units 14 and 15 with their respective pole-pieces 16 and 17 as well as the switch 70. The main source of supply, which in the present instance is 110 volts direct current, is represented by leads 115 and 116 extending to a main switch 117 which is also shown in the lower left hand corner of Fig. 1. The circuit is so arranged that a lamp 118 will be illuminated when the main switch 117 is closed. Another lamp 119 is conditioned to be illuminated when the circuit is completed through the electromagnets 14 and 15, these lamps respectively indicating to the operator when the apparatus is in condition for use and when the charging circuit is completed. The circuit through the lamp 118 may be traced from the lead 115, the switch 117, connections 120 and 121, through the lamp 118, connections 122, 123, 124 and 125, and through the switch 117 to the lead 116. The circuit through the lamp 119 is traced from the lead 115 through switches 117 and 70, through connections 127 and 138, the lamp 119, connections 122, 123, 124 and 125, and through the switch 117 to the lead 116.

The circuit for energizing the electromagnetic units 14 and 15 is, as previously described, controlled by the switch 70. Therefore, when the switch 70 is closed the circuit is completed from lead 115 through the switch 117, through the switch 70, connection 127, through winding 128 of a mercury relay switch 129, through the connections 123, 124 and 125, through the switch 117 to the lead 116. The energization of the coil 128 of the mercury relay switch 129 will cause movement of the switch from the solid line position to the dotted line position, causing the mercury therein to complete electrical connection between its terminals 130 and 131 to complete an electrical circuit from the lead 115 through the switch 117, connections 120 and 121, through the windings of the units 14 and 15, through a connection 132, the terminal 130, through the pool of mercury in the switch 129, through the terminal 131, connections 124 and 125, and through the switch 117 to the lead 116. Thus the electromagnet is energized when the switch 70 is closed and it remains energized until the switch is again opened. To eliminate the possibility of the high surges out of the pole-pieces 16 and 17, when the circuit through the electromagnet is broken, condenser contact protection circuits are provided to prevent the lamps 118 and 119 from burning out. The protection circuit for the lamp 118 is traced from a connection 135 through a condenser 136 and through connection 123 to the connection 122, thus shunting the high surge of electrical energy into the condenser rather than through the lamp. A similar circuit for the lamp 119 is traced from connection 122 through a condenser 137 to a connection 138. This circuit in a similar manner shunts the high surge of electrical energy through the condenser 137 rather than through the lamp 119.

Considering now the operation of the apparatus, the operator first moves a carriage into its upper or lower position depending upon the type of article, which in the present instance is a relay to be charged. The carriage is normally in its forward position to receive the articles singly to be charged. For the purpose of illustration, let it be assumed that the carriage is in its upper and forward position as illustrated in Fig. 3. In this position the adapted 22 for the type of relay to be charged is placed on the carriage in interengagement with the pins 21, after which the relay is mounted thereon. Suitable means (not shown) may be provided to accurately locate the relay on the adapted and hold the relay against movement with respect to the adapter during the charging operation. The operator then satisfies himself that the pole-pieces are properly located and that the pole members 101 of the relay are moved outwardly the desired distances. If the operator should fail to perform these duties, operation will not be permitted. For example, if the pole-pieces 16 and 17 are not moved outwardly to positions for the charging of magnets of the relays of the type which are charged in the upper position the relays will engage the pole-pieces and prevent movement of the relay on the carriage into charging position. Furthermore, if the pole members 101 of the relay are not moved outwardly desired distances the portion 107 of the relay will engage the projections 106 of the stop members 105 and be prevented from movement into the charging position. However, if the operator has performed these duties properly he may move the carriage rearwardly by pushing on the handle 28, moving the relay between the pole-pieces and causing the outer ends of the pole members 101 to ride on the cam-like surfaces 108 of the stops 105, moving the stops about their pivots 109 against the forces of their springs 110 to move the projections 106 out of the path of the portion 107 of the relay, allowing the relay to continue its rearward movement on the carriage. The carriage in moving rearwardly is guided by the rails 50 and 51 between which it passes and by means of which it is maintained in alignment between pole-pieces to accurately position the magnet of the relay while being charged.

It is impossible for the operator to partially charge the magnet due to the fact that the charging circuit will not be completed until the carriage has been moved to its extreme rearward position to move the slide 73 through its engagement with the projection 80 rearwardly, moving the cam 72 into engagement with the plunger 71 to close the switch 70. Furthermore, when the carriage has been moved rearwardly a sufficient distance to close the switch 70, it has also caused the latch 83 to enter the recess 100 to lock the carriage against movement until the electrical circuits have been completed to energize the electromagnet and build up its maximum magnetic field for thoroughly charging the magnet 59 of the relay. When the switch 70 is closed the circuit is completed through the lamp 119, to indicate the completion of the circuit, and also through the winding 128 of the mercury relay switch to complete the circuit through the units 14 and 15. Not until the magnetic field created by the electromagnet has reached its maximum, sufficient to attract the member 96 (Fig. 3) to actuate the mechanism, that is, the pull rod 93 and the lever 89, against the force of the spring 97 to move the latch 83 free of the carriage, will the operator be able to move the carriage forwardly. Thus when the magnetic field is properly created the operator may move the relay and the magnet 59 forwardly, moving the latter completely through and out of the magnetic field to completely saturate the magnet and locate the poles thereof at its extreme ends. If the magnetic circuit should be allowed to be broken prior to the traversing of the magnet through the magnetic field the poles would be located at the positions lying in the center lines of the pole-pieces when the magnetic circuit is broken. This possibility is eliminated by the holding of the switch 70 closed until the carriage has been moved to its extreme forward position, moving the magnet of the relay completely out of the magnetic field before the carriage engages the forward end 79 of the slide 73 to move the cam 72 free of the plunger 71 and allow the sw 70 to open, opening the circuit through electromagnet.

It is apparent that the operator is prevel from doing other than the essential things 1 essary to properly charge the magnet. In dition to the means just defined the rollers and 67 prevent the operator from lowering raising the carriage during the charging ope tion. As illustrated in Fig. 1, the roller 66 r upon the rail 51 (Fig. 2) when the carriag in any position other than its extreme forw position. Therefore, the operator can only just the carriage in that position. Let it assumed that the operator wishes to charge m nets of relays of the type wherein the magr are disposed so as to require lower positions proper relationship with the pole-pieces dur the charging operation. The operator may tl pull the pin 42 outwardly when the carriage in its foremost position, freeing the pin from sleeve 34 so that the shaft 25 may be rota counterclockwise, causing the pinions 31 to r down their respective racks 37 until the sle 34 engages the stop 41. The carriage will tl be positioned to receive another type of re with a magnet to be charged, the rollers 66 a 67 during this downward movement of the c riage having passed through the recess 68 (I 2) in the rail 51.

The magnets of the relays charged in t lower position of the carriage are of the smal type requiring inward movement of the po pieces so that the inner ends of the pole-pie will be properly located relative to the magn to be charged with only the necessary air g therebetween. The inner movement of the po pieces is brought about by removing the latcl 64 from engagement with the nuts 62 on t studs 60, allowing the springs 63 to force t pole-pieces inwardly until the nuts 62 enga the plates 61. The air gap between the po pieces and the magnet being charged may previously adjusted by movement of the nuts on their respective studs 60. The inward mov ment of the pole-pieces, viewing Fig. 4, w cause movement of the latches 55 about the pivots to move the projections 57 free of t carriage to allow movement of the carriage wi the relay into and out of charging positior With the carriage thus in its forward and lowe most position a suitable adapter 22 may 1 placed on the pins 21 to support the type of relay having a magnet to be charged, after whic the carriage may be moved rearwardly throug the movement of the handle 28, carrying out tl operations previously described, that is, closir of the switch 70 through the slide 73, locking the carriage through the latch 83, and holdir the carriage against the forward movement unt the magnetic field has built up sufficiently t attract the member 96 and move the mechanisi associated therewith to free the latch 83 of tk recess 85 and thus permit the operator to mov the carriage forwardly, moving the magnet o the relay past the pole-pieces, where it will be come saturated, and the poles of the magne located at the extreme ends thereof as the mag net is drawn from the magnetic field. Th movement of the handle 28 to move the carriag causes the shaft 25 to move through its aper tures 27 in the base through the washers 3 the pinions 31 and the sleeve 34. The roller 6 rides beneath the rail 51, preventing adjustmen that is, vertical movement of the carriage during the charging operation.

Another type of relay (Fig. 5) having two small magnets to be charged may be mounted on the carriage and moved through one charging operation for the lower magnet, while in the upper position, and then moved through the charging position to charge the upper magnet while in the lower position by an adjustment of the carriage in between operations during the location of the carriage in its foremost position.

In reviewing the features of the apparatus, it will be observed that the carriage may be adjusted only in one position and that position is its extreme forward position, with the article to be charged out of the charging position. Furthermore, the article cannot be charged unless properly conditioned and properly positioned on the carriage; also the article cannot be charged unless the pole-pieces of the charging units of the electromagnet are properly positioned with respect thereto. Furthermore, the article cannot be partially charged by a movement through the magnetic field until its field has been properly conditioned by allowing sufficient time for this to occur after the circuit has been closed to the electromagnet. It is further impossible to improperly locate the poles of the magnet being charged by the breaking of the circuit through the electromagnet during the charging operation due to the fact that the switch 70 will remain closed until the carriage has reached its foremost position, at which time the article has been completely moved from the magnetic field. Another feature lies in the rollers 66 and 67 in eliminating the possibility of adjustment or movement of the article out of the proper path for satisfactory charging during the charging operation and finally, the apparatus may be adjusted at the proper time, that is, during the proper position of the carriage to condition the apparatus for charging various types of articles.

The embodiment of the invention herein disclosed is merely illustrative and may be widely modified and departed from in many ways without departing from the spirit and scope of the invention as pointed out in and limited to the appended claims.

What is claimed is:

1. A magnetic charging apparatus comprising an electromagnet having spaced pole units, an electrical circuit to supply electrical energy to the units to create therein magnetic fields of opposite polarity to charge an article, a switch actuable to control the circuit, a carriage adapted to support the article thereon, means to move the carriage to move the article thereon between the pole units to a starting position, where the article will be ready to receive the charge, and to return the carriage with the article between the pole units for the charging of the article thereby, and means under the control of the carriage to prevent actuation of the switch until the article is substantially in the starting position and to actuate the switch at that time to charge the article only during the return movement of the carriage.

2. A magnetic charging apparatus comprising an electromagnet having spaced pole units, an electrical circuit to supply electrical energy to the units to create therein magnetic fields of opposite polarity to charge an article, a switch actuable to control the circuit, a carriage adapted to support the article thereon, means to move the carriage to move the article thereon between the pole units to a starting position, where the article will be ready to receive the charge, and to return the carriage with the article between the pole units for the charging of the article thereby, means under the control of the carriage to prevent actuation of the switch until the article is substantially in the starting position and to actuate the switch at that time to charge the article only during the return movement of the carriage, and means adapted to hold the carriage with the article in the starting position until the said magnetic field has been created.

3. A magnetic charging apparatus comprising an electromagnet having spaced pole units, an electrical circuit to supply electrical energy to the units to create therein magnetic fields of opposite polarity to charge an article, a switch actuable to control the circuit, a carriage adapted to support the article thereon, means to move the carriage to move the article thereon between the pole units to a starting position, where the article will be ready to receive the charge, and to return the carriage with the article between the pole units for the charging of the article thereby, means under the control of the carriage to prevent actuation of the switch until the article is substantially in the starting position and to actuate the switch at that time to charge the article only during the return movement of the carriage, and means under the control of the carriage to cause the said switch actuating means to free the switch to open the circuit only when the carriage with the article has substantially completed its return movement.

4. A magnetic charging apparatus comprising an electromagnet having spaced pole units, an electrical circuit to supply electrical energy to the units to creater therein magnetic fields of opposite polarity to charge an article, a switch actuable to control the circuit, a carriage adapted to support the article thereon, means to move the carriage to move the article thereon between the pole units to a starting position, where the article will be ready to receive the charge, and to return the carriage with the article between the pole units for the charging of the article thereby, means under the control of the carriage to prevent actuation of the switch until the article is substantially in the starting position and to actuate the switch at that time to charge the article only during the return movement of the carriage, means adapted to hold the carriage with the article in the starting position until the said magnetic field has been created, and means attracted by the said magnetic field to release the holding means.

5. A magnetic charging apparatus comprising an electromagnet having spaced pole units, an electrical circuit to supply electrical energy to the units to create therein magnetic fields of opposite polarity to charge portions of articles, a switch actuable to control the circuit, a carriage to support various types of articles having portions to be charged disposed varied distances from the carriage when the articles are singly supported by the carriage, and adjustable means adapted to move the carriage in different paths relative to the units to move the portions of the various articles singly in a given path between the units and between a loading position and a starting position, and means under the control of the carriage to prevent actuation of the switch until the carriage is substantially in the starting position.

6. A magnetic charging apparatus comprising an electromagnet having spaced pole units, an electrical circuit to supply electrical energy to the units to create therein magnetic fields of opposite polarity to charge portions of articles, a switch actuable to control the circuit, a carriage to support various types of articles having portions to be charged disposed varied distances from the carriage when the articles are singly supported by the carriage, adjustable means adapted to move the carriage in different paths relative to the units to move the portions of the various articles singly in a given path between the units and between a loading position and a starting position, means under the control of the carriage to close the switch to thus close the circuit when the carriage is in the starting position, and means to hold the carriage against movement of any of the portions out of the starting position until the said magnetic field is created.

7. A magnetic charging apparatus comprising an electromagnet having spaced pole units, an electrical circuit to supply electrical energy to the units to create therein magnetic fields of opposite polarity to charge portions of articles, a switch actuable to control the circuit, a carriage to support various types of articles having portions to be charged disposed varied distances from the carriage when the articles are singly supported by the carriage, adjustable means adapted to move the carriage in different paths relative to the units to move the portions of the various articles singly in a given path between the units and between a loading position and a starting position, means under the control of the carriage to close the switch to thus close the circuit when the carriage is in the starting position, and means adapted to hold the said adjustable means against adjustment of the carriage for movement in a selected one of the different paths except when the carriage is in the said starting position.

8. A magnetic charging apparatus comprising an electromagnet having spaced pole units, an electrical circuit to supply electrical energy to the units to create therein magnetic fields of opposite polarity to charge portions of articles, a switch actuable to control the circuit, a carriage to support various types of articles having portions to be charged disposed varied distances from the carriage when the articles are singly supported by the carriage, adjustable means adapted to move the carriage in different paths relative to the units to move the portions of the various articles singly in a given path between the units and between a loading position and a starting position, means under the control of the carriage to close the switch to thus close the circuit when the carriage is in the starting position, means adapted to hold the said adjustable means against adjustment of the carriage for movement in a selected one of the different paths except when the carriage is in the said starting position, and means adapted to hold the carriage for movement only in the selected path.

9. A magnetic charging apparatus comprising an electromagnet having spaced pole units, an electrical circuit to supply electrical energy to the units to create therein magnetic fields of opposite polarity to charge portions of articles, a switch actuable to control the circuit, a carriage to support various types of articles having portions to be charged disposed varied distances from the carriage when the articles are singly supported by the carriage, adjustable means adapted to move the carriage in different paths relative to the units to move the portions of the various articles singly in a given path between the units and between a loading position and a starting position, means under the control of the carriage to close the switch to thus close the circuit when the carriage is in the starting position, and means actuable to hold the carriage in the said starting position of any of the said paths until the said magnetic fields have been created.

10. A magnetic charging apparatus comprising an electromagnet having spaced pole units, an electrical circuit to supply electrical energy to the units to create therein magnetic fields of opposite polarity to charge an article, a switch actuable to control the circuit, a carriage adapted to support the article thereon, a slidable member to support the carriage for movement in a given path to move an article on the carriage between the pole units to a starting position, where the article will be ready to receive the charge, and to return the carriage with the article between the pole units to a final position for the charging of the article, and an element stationary throughout most of the carriage movement but movable by the carriage when adjacent the starting position to actuate the switch to close the circuit.

11. A magnetic charging apparatus comprising an electromagnet having spaced pole units, an electrical circuit to supply electrical energy to the units to create therein magnetic fields of opposite polarity to charge an article, a switch actuable to control the circuit, a carriage adapted to support the article thereon, a slidable member to support the carriage for movement in a given path to move an article on the carriage between the pole units to a starting position, where the article will be ready to receive the charge, and to return the carriage with the article between the pole units to a final position for the charging of the article, and an element stationary throughout most of the carriage movement but movable by the carriage when adjacent the starting position to actuate the switch to close the circuit and movable by the carriage when adjacent the final position to free the switch for the opening of the circuit.

12. A magnetic charging apparatus comprising an electromagnet having spaced pole units with pole pieces, means to vary the positions of the pole pieces relative to each other for portions of various types of articles, an electrical circuit to supply electrical energy to the units to create therein magnetic fields of opposite polarity to charge portions of articles, a switch actuable to control the circuit, a carriage to support various types of articles having portions to be charged disposed varied distances from the carriage when the articles are singly supported by the carriage, and adjustable means adapted to move the carriage in different paths relative to the units to move the portions of the various articles singly in a given path between the units and between a loading position and a starting position, and means under the control of the carriage to prevent actuation of the switch until the carriage is substantially in the starting position and to actuate the switch at that time to thus close the electrical circuit.

EDWIN ARNOLD.